Sept. 9, 1952 P. GARNIER 2,609,903
CLUTCH MECHANISM
Filed July 16, 1942
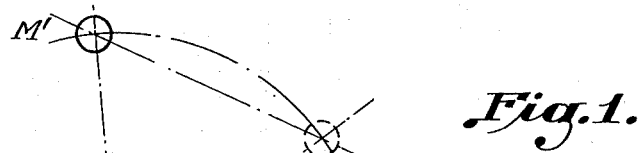
Fig.1.
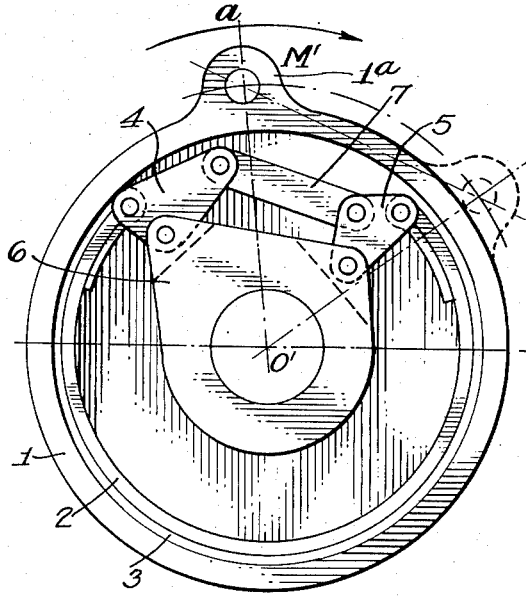
Fig.2.
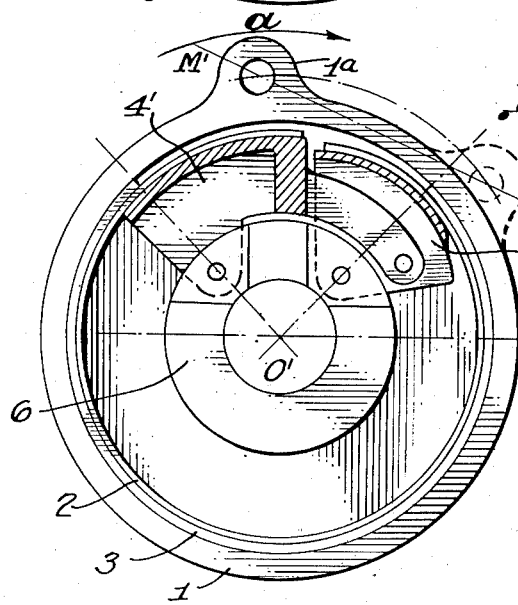
Fig.3.
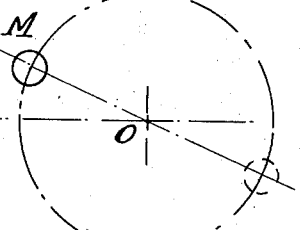
INVENTOR.
PAUL GARNIER.
By Louise O'Neil
Attorneys.

Patented Sept. 9, 1952

2,609,903

UNITED STATES PATENT OFFICE 2,609,903

CLUTCH MECHANISM

Paul Garnier, Lyon, France; vested in the Attorney General of the United States

Application July 16, 1942, Serial No. 451,094
In France July 7, 1941

Section 1, Public Law 690, August 8, 1946
Patent expires July 7, 1961

3 Claims. (Cl. 192—41)

As is known, numerous change speed gears are based on the general principle of transmitting motion from a driving shaft to a driven shaft by means of a plurality of units each of which comprises a pair of cranks interconnected by a pitman, one of said cranks having a constant throw and being connected to the driven shaft by means of a free wheel clutch adapted to impart motion to said shaft in one direction of rotation only, while the other crank is fast upon the driving shaft and has an adjustable length or throw. Owing to this construction, it will be understood that by multiplying the number of driving cranks and driven cranks and by suitably arranging them around their respective axes, the possibility is afforded of converting into a continuous movement the series of elementary impulses received by the driven shaft and of rendering its speed sufficiently uniform, while by adjusting the throw of the cranks mounted on the driving shaft the amplitude of such elementary impulses imparted to the driven shaft and consequently its speed of revolution may be varied, said speed being brought down to zero value when the throw of said cranks is reduced to such value by causing the pitman ends to coincide with the driving axis.

Known gears based on the aforesaid principle show a number of disadvantages, one of which is the practical difficulty of providing a sufficiently simple and rugged free wheel clutch for use as above stated.

An object of the invention is to provide an improved change speed mechanism comprising a free wheel clutch including differentials involving frictional bands or strips of flexible nature cooperating with impulse transmitters so as to properly select impulses to be transmitted.

With this and such other objects in view as will incidentally appear hereafter, the invention comprises the novel construction, combination and arrangement of parts that will now be described with reference to the accompanying diagrammatic drawings exemplifying the same and forming a part of the present disclosure.

In the drawings—

Figure 1 is a diagrammatic illustration showing the kinetic principle on which is based the operation of the improved mechanism according to the invention.

Figure 2 is a view of a constructional embodiment of the clutch comprised in said mechanism and associated with the driven shaft.

Figure 3 is a view similar to Fig. 2 showing a modification of this clutch.

Reference being first had to Fig. 1, O designates the geometrical axis of a driving shaft, and O' the geometrical axis of a driven shaft which is to be connected to said driving shaft through a change speed mechanism of the crank and pitman type. A primary crank extending radially from the driving axis O is designated by OM, and a secondary crank of greater length than the primary crank OM and extending radially from driven axis O' is designated by O'M'. These two cranks are interconnected by a pitman designated by MM' so that one complete revolution of the driving shaft corresponds to two equal and oppositely directed oscillations of the crank O'M'. Assuming the driving connection between the crank O'M' about axis O' to be in the form of a free wheel clutch adapted to impart the drive in one direction of rotation only (as shown by the arrows $a$ in Figs. 2 and 3), it will be understood that a continuous motion of crank OM about the driving axis O will impart a series of impulses about the driven axis O' in the direction permitted by said free wheel clutch.

Owing to this arrangement, it is possible to provide a sufficient number of driving and driven cranks and to suitably distribute them around their respective axes to cause the motion of a driven shaft coinciding with axis O' to become continuous and to ensure substantial uniformity of its speed.

It will be also understood that, assuming the throw of the driven crank O'M' to remain invariable, where the throw of the driving crank OM is reduced, the extent of the elementary impulses imparted about the driven axis O' will be reduced a corresponding amount and hence the substantially continuous rotational speed about driven axis O' will be slower. It will even fall to zero if the crank throw OM is itself reduced to zero.

Therefore, assuming the driving shaft coinciding with axis O to revolve at a uniform speed, it is possible to transmit a variable speed to the shaft coinciding with axis O' by a mere variation of the throw or throws of the driving crank or cranks such as OM.

In order to obviate the disadvantages of the several change speed gears based on the aforesaid operative principle, the following arrangements of parts have been devised according to the invention.

*Free wheel clutch (Figs. 2 and 3)*

The actuation of the driven shaft is performed not by ratchet wheels, pawls, balls and wedges but by a flexible ring constituting a band clutch whose operation corresponds with the one of so-called differential band brakes, the characteristic feature of which is to become tightened or applied in a predetermined rotational direction and untightened or released in the opposite direction.

As shown in Fig. 2, a cup-shaped transmitter member 1 is freely centered on the driven shaft coinciding with axis O' and has an apertured lug 1ª on its periphery for connection to the pitman represented by MM'. As the driving shaft rotates clockwise about axis O, the pitman MM' is reciprocated so that its end M' assumes the forward position 1ᵇ shown in dotted lines and then resumes its rear position as at 1ª. Against the inner rim of this cup-shaped member 1 is applied over approximately two thirds of its circumference a ring segment 2 made of a steel strip endowed with qualities of strength and flexibility. The ring segment 2 is provided on its surface contacting the impulse transmitter member 1 with a friction lining 3. The ring segment 2 constitutes the driven ring element and is connected at both ends to toggle levers 4, 5 hinged to a sleeve 6 firmly girdling the driven shaft at O'.

Assuming the flexible ring segment assembly 2, 3 to be applied as usual against the cup-shaped member 1 and to bear on it with a very weak preliminary force, as soon as said member 1 is actuated in the required direction, each end of the ring segment assembly exerts frictional pressure upon the member 1 and transmits to the lever which carries the assembly end a stress of such magnitude that one of them is several times as large as the other.

In the operation of the clutch mechanism shown in Figure 2, the assembly 2, 3 grips the interior of cup member 1 because of a shifting of certain pivots, levers, and link means. For example, when member 1 is oscillated in the clockwise direction indicated by arrow a, the weak preliminary frictional contact between this member and the assembly 2, 3 will cause the latter to also rotate in a clockwise direction along with the cup member thereby rotating the outer end of lever 5 in a corresponding direction about its pivot on sleeve 6 to press the associated band assembly end into engagement with the interior of the cup member. The assembly is then expanded throughout its length against the interior surface of the cup member with an increased pressure, and this expansion also tends to rotate lever 4 about its pivot on sleeve 6.

By interconnecting the levers 4 and 5 by means of a coupling link 7, the effect of these two frictional pressures at the band assembly ends can be transmitted from one upon the other. For example, if a small frictional pressure t is initiated at one end, a relatively large frictional pressure T is set up at the opposite end. A portion of this large pressure T is then transmitted by link 7 to the frictional pressure t, thus increasing the latter frictional pressure to t', which in turn gives rise to a correspondingly increased frictional pressure T' at the opposite end. The frictional pressures between the assembly 2, 3 and the cup member 1 are successively increased along the interior periphery of the cup member in the manner described above until the proper driving force is obtained.

For a reverse drive, it will be understood from analogous reasons that full release is also automatic.

Depending upon the position of the hinges which pivotally connect the link 7 to the levers 4, 5, a possibility is obtained of varying the ratio in which the frictional pressures T and t react upon each other.

An absolutely immediate drive is thus secured which is smooth and devoid of jerks and rattle.

In practical construction, the number of hinges or pivotal joints should be minimized. Thus, for example, both ends of the ring segment 2 may be interconnected as shown in Fig. 3. In this constructional form, the hinges of the ring segment to the levers are replaced by a direct fastening of the flexible strip forming said ring segment assembly 2, 3 to the levers 4' and 5' and the inherent flexibility of the strip permits, for those very small oscillations which are necessary, relative motions between the assembly and the levers. Moreover, these levers have a particular shape which enables them to be interconnected by a mere contact. These shapes are not, however, limitative. The cup-shaped member might be pulled back by a return spring. Thus changes in the contacting point of the trunnions are avoided when the direction of operation is reversed.

What is claimed is:

1. A one way clutch comprising a rotary driven member, an annular driving member rotatably mounted about said driven member, a flexible ring segment engageable with a major portion of the inner periphery of said annular member, means connected to said driven member and individual to the ends of said segment for initiating progressively increasing frictional pressure from one segment end to the other against the inner periphery of said annular member during the rotation of the latter in one direction and for permitting unrestricted rotation of said annular member in the opposite direction, a sleeve fixedly secured to said driven member, a pair of levers pivotally secured to said sleeve, the free ends of said levers being respectively pivoted to the ends of said segment, and a link pivotally connected to each of said levers at points eccentric of the pivot points of the levers to said sleeve.

2. A one way clutch comprising a rotary driven member, an annular driving member rotatably mounted about said driven member, a flexible ring segment engageable with a major portion of the inner periphery of said annular member, means connected to said driven member and individual to the ends of said segment for initiating progressively increasing frictional pressure from one segment end to the other against the inner periphery of said annular member during the rotation of the latter in one direction and for permitting unrestricted rotation of said annular member in the opposite direction, a sleeve fixedly secured to said driven member, a pair of levers pivotally secured to said sleeve, the free ends of said levers having the respective ends of said segment secured thereto, and a projection extending from the intermediate portion of said levers and pivotally secured to the intermediate portion of the other of said levers.

3. A one way clutch comprising a driven shaft, a cup-shaped driving member rotatably mounted upon said driven shaft, a flexible ring segment engageable with a portion of the inner surface of said cup-shaped member, means secured to and eccentrically pivoted on said driven shaft for initiating a frictional pressure between one end of said segment and the inner surface of the cup-shaped member during the rotation of the latter in one direction and for permitting unrestricted rotation of said cup-shaped member in the opposite direction, means being operable upon the initiation of said frictional pressure for initiating a relatively larger frictional pressure between the other end of said segment and the inner surface of said cup-shaped member and means for transmitting a portion of said larger frictional pressure at said other segment end to the frictional pressure at said first named segment end.

PAUL GARNIER.

REFERENCES CITED

The following references are of record in the file of this patent:

UNITED STATES PATENTS

| Number | Name | Date |
|---|---|---|
| 230,773 | Hartmann | Aug. 3, 1880 |
| 259,199 | Osborn | June 6, 1882 |
| 787,788 | Pinard | Apr. 18, 1905 |
| 926,915 | Waters | July 6, 1909 |
| 999,037 | Kleinman | July 25, 1911 |
| 1,351,938 | Allen | Sept. 7, 1920 |
| 1,457,946 | Sommers | June 5, 1923 |
| 2,367,555 | Arney | Jan. 16, 1945 |

FOREIGN PATENTS

| Number | Country | Date |
|---|---|---|
| 6,389 | Great Britain | Mar. 16, 1904 |
| 255,863 | Italy | Nov. 17, 1927 |
| 552,105 | Germany | June 9, 1932 |